United States Patent [19]

Ho et al.

[11] Patent Number: 5,391,622
[45] Date of Patent: Feb. 21, 1995

[54] ELECTRICALLY CONDUCTING LIQUID-CRYSTAL POLYMER BLENDS AND PROCESS FOR THE PREPARATION THEREOF

[75] Inventors: Ko-Shan Ho; Kalle Levon, both of New York, N.Y.

[73] Assignee: Neste Oy, Espoo, Finland

[21] Appl. No.: 237,330

[22] Filed: May 3, 1994

Related U.S. Application Data

[63] Continuation of Ser. No. 886,520, May 20, 1992, abandoned.

[51] Int. Cl.⁶ .............................................. C08F 28/06
[52] U.S. Cl. .................................... 525/171; 525/256; 525/185; 528/380
[58] Field of Search ............... 525/185, 171, 256; 528/380

[56] References Cited

U.S. PATENT DOCUMENTS

| | | | |
|---|---|---|---|
| 4,711,742 | 12/1987 | Jen | 252/500 |
| 4,737,557 | 4/1988 | Sato | 526/256 |
| 5,171,632 | 12/1992 | Keeger | 428/364 |
| 5,279,768 | 1/1994 | Destryker et al. | 252/500 |

Primary Examiner—James J. Seidleck
Assistant Examiner—I. Zemel
Attorney, Agent, or Firm—Cohen, Pontani, Lieberman, Pavane

[57] ABSTRACT

The present invention concerns electrically conducting polymer blends, processs for production thereof, and fibers and films essentially consisting of electrically conducting polymer blends. According to the invention, the polymer blends comprise matrix polymers and electrically conducting polymer components possessing liquid-crystal properties. In particular, the liquid-crystal polymer components comprise a main chain incorporating conjugated double bonds, the monomer units of the main chain being linked to side chains which, together with the main chain, render the polymer liquid-crystal properties at elevated temperatures. The blends are prepared by melt blending a matrix polymer and a liquid-crystal polymer and by treating the blend thus prepared with a dopant to make the liquid-crystal polymer conducting. The polymer blends can be processed into fibers or films using conventional processing methods of plastics such as die extrusion, injection molding, injection molding, ram molding or film blowing.

13 Claims, 7 Drawing Sheets

ELECTRICALLY CONDUCTING LIQUID-CRYSTAL POLYMER BLENDS AND PROCESS FOR THE PREPARATION THEREOF

This is a continuation of U.S. application Ser. No. 07/886,520, filed May 20, 1992, now abandoned.

FIELD OF THE INVENTION

The present invention relates to conducting polymer blends. More particularly, the invention relates to polymer blends composed of polymer matrices, electrically conducting components and possible additives and compounding ingredients. The invention also concerns methods for production of electrically conducting polymer blends, and fibers and films which are processed from electrically conducting polymer blends.

DESCRIPTION OF RELATED ART

Electrically conducting resin composites, also called composite plastic materials or polymer blends, are generally prepared by mixing carbon black, carbon fibers, metal particles or metal fibers in a molten matrix polymer. The electrical conductivity of such resin composites is dependent on the mutual contacts of the filler particles. Typically, a concentration of approx. 10 to 50% wt. of homogeneously dispersed filler material is required to achieve blends of high electrical conductivity.

Conventional technology of the art encounters several problems. For instance, the mechanical properties of composites are crucially degraded with an increase in filler material percentage. The electrical conductivity is difficult to control, particularly within the region of semiconductivity, and the homogenous dispersion of the filler material in the matrix polymer is difficult.

It is an object of the present invention to overcome the drawbacks associated with the prior-art technology and to achieve a homogeneous polymer blend, which is composed of an intrinsically electrically conducting polymer, capable of acting as an electrical conductor, and a matrix polymer (or matrix thermoplastic), capable of rendering the blend the required mechanical properties. It is a particular object of the invention to achieve such a polymer blend in which the mechanical properties of the electrically conducting component are optimized at relatively low temperatures in order to facilitate easy processing of desired polymer products from the polymer blend. Such required processing properties are to be found in, e.g., liquid-crystal polymers.

Electrically conducting polymers are subjected to intensive research around the world. They can be prepared from organic polymers having long conjugated chains of double bonds. The $\pi$-electrons of the double bonds are disturbed by doping the polymer with certain dopants which may be electron acceptors or donators. Then, the doping produces vacancies or alternatively excess electrons in the polymer chain that facilitate current flow along the conjugated chain. The electrical conductivity of the polymer can be controlled by varying the dopant concentration so as to cover nearly the entire spectrum of conductivity from insulators to metals.

The above-mentioned polymers are suited to several interesting fields of application. For instance, they can be utilized to replace metallic conductors and semiconductors in multiple applications such as batteries, photoelectric components, printed-circuit boards, antistatic packaging and electromagnetic interference (EMI) suppression materials.

In comparison with metals, the potential advantages of electrically conducting polymers are their light weight, mechanical properties, stability in corrosive environments and lower costs in synthetic preparation and processing. It must be noted, however, that the processing and stability properties of most intrinsically electrically conducting polymers do not today permit their use in the above-described applications.

Polymers that can be modified electrically conducting by doping include polyacetylene, poly-para-phenylene, polypyrrole, polythiophene and polyaniline.

Liquid-crystal polymers are also being investigated widely. Their spinning and tenacity characteristics in the liquid-crystal state offer optimal prerequisites for the processing of fibers with high mechanical performance. The orientation of polymer chains in the liquid-crystal state under the influence of an electrical or magnetic field also provides a possibility of using said polymers in the optical systems of display terminals and other applications utilizing optical effects.

The actual liquid crystal in liquid-crystal polymers is formed by a rigid structural unit called a mesogen. Mesogens are generally formed by two or more linearly substituted ring units linked to each other via a short, rigid bridging group known as a spacer. Liquid-crystal polymers can be divided into two main categories, viz. main-chain and side-chain liquid-crystal polymers, depending on whether the mesogenic groups are located in the main chain or in the side chain. Main-chain liquid-crystal polymers are generally polymers of highly rigid character whose stable crystalline structure can only be melted by using abundant energy. Therefore, their melting occurs at high temperatures, whereby thermal decomposition is simultaneously involved. Side-chain liquid-crystal polymers in turn are determined by the liquid-crystal behavior of the side-chain substituent irrespective of the main-chain structure. The substituent (mesogen) in the side chain frequently has the chemical structure of a biphenyl-cyano group.

To complete the survey, it should be mentioned that conventionally known are also such polymers in which the liquid-crystal properties are combined with electrical conductivity. These compositions are invariably of the side-chain type described above. For instance, the published JP Application No. 2,227,425 discloses a polymerized thiophene derivative having a mesogenic biphenylester substituent as its side chain. Said group is also claimed to have ferroelectric properties. A similar polythiophene polymer is also known from the published GB Application No. 2,225,008 also having mesogenic cyanobiphenyl derivatives as the substituents of the thiophene ring. The EP Patent Specification No. 0 106 175 as well discloses an electrically conducting liquid-crystal composite in which the backbone exhibiting liquid-crystal behavior is directly or indirectly linked to a complex group capable of electron transfer.

The most essential disadvantage of above-described electrically conducting liquid-crystal polymer alternatives is their high cost of synthesis due to the complicated grafting of the biphenylcyano group to the side chain.

As mentioned above, conventional electrically conducting polymer composites typically utilize carbon black, carbon fibers, metallic particles and/or metal fibers as the electrically conducting component. Known in the art are, however, such compositions in which which one component of the composite blend is an intrinsically electrically conducting polymer of the type described above. For instance, Galvin and Wnek have described the polymerization of polyacetylene into a polyethene film impregnated with a catalyst [M. E. Galvin and G. E. Wnek, Polym. Commun., 23 (1982), 795]. Using electrochemical methods, polypyrrole can be polymerized in a resin matrix, whereby an electrically conducting composite is achieved having improved mechanical properties over those of pure polypyrrole [S. E. Lindsey and G. B. Street, Synthetic Metals, 10 (1985) 67]. Polypyrrole has also been used as the electrically conducting component in a polypyrrole cellulose composite [R. B. Björklund and I. Lundström, Electronic Materials, 13 (1984) 211-230 and DE patent application 33 21 281]. Through diffusion of a pyrrole or aniline monomer in a monomer matrix, then treating the impregnated polymer matrix with an oxidizer such as ferric(III)chloride, $FeCl_3$, an electrically conducting polymer composite has been attained in which the electrical conductivity is provided by the polypyrrole or polyaniline [U.S. Pat. No. 4,604,427, 1987].

Albeit the relatively good electrical conductivity of these composite structures known in the art, their processing properties are not sufficient good for allowing processing of fibers and films for special applications.

SUMMARY OF THE INVENTION

The present invention concerns a polymer blend exhibiting a good electrical conductivity, yet being compatible with processing in both liquid-crystal and isotropic states using, e.g., die extrusion, injection molding, ram molding or film blowing techniques.

Our invention is based on the concept of preparing a conductive polymer blend by blending a conducting component which also exhibits liquid-crystal properties with a suitable matrix polymer. Said conducting component can be any of the conductive liquid-crystal polymers mentioned above. However, it is preferred to use a polymer which has conjugated double bonds in its main chain, said polymer being doped with a suitable dopant of the electron-acceptor, or alternatively, electron-donor type. Preferably, the polymer selected for doping is of a kind having rigid groups (known as mesogenic groups) in its main chain. The double bonds may, in particular, be located in said mesogenic groups.

It has been found that many unsubstituted polymers having the above-mentioned rigid basic structure are difficult to process. This is mainly due to their high melting points. Therefore, according to the invention, it has surprisingly been found that by attaching suitable side chains to the main chain of the polymer it is possible to achieve transition of said rigid polymers into the liquid-crystal phase at relatively low temperatures. This phenomenon may be related to the fact that the substituent groups prevent the contiguous aggregation of the main chains of the polymers. Thus, the substituents would seem to have a dissolving effect, thereby allowing the polymers to attain their liquid-crystal properties at such temperatures which still are compatible with easy processing.

Within the scope of the present application, the terms "polymer blend" and "polymer composite" refer to a combination of two or more different polymers. In an advantageous specific case the polymer blend is comprised of a matrix polymer into which another polymer material is embedded. In this context, the terms "blend" and "composite", respectively, are used as full synonyms of each other.

"Liquid-crystal" polymers (in the following also abbreviated to LCD) are polymers whose molten phase exhibits characteristics remaining between the solid phase and the liquid phase, thereby remaining in a so-called mesophase or anisotropic phase.

The term "mesogen" or "mesogenic" structural unit in the context of this application refers to rigid structural units, which principally are responsible for the liquid-crystal properties of the substituted polymer chains. Typical mesogens are, for instance, the thiophene monomers of polythiophene.

The term "room temperature" refers to a temperature in the range from approx. 15° C. to approx. 25° C.

The conducting liquid-crystal polymer used in the polymer blend according to the invention and its properties are described in greater detail in our copending patent application Ser. No. 07/886,519.

The main chain can be formed by any polymer(s) capable of being modified into conducting form provided that they contain mesogenic structural units which can behave like liquid crystals. As examples of main chains are polyacetylene, polypara-phenylene, polypyrrole, polythiophene and polyaniline, to mention a few. The mesogenic structural units are substituted by side chains which prevent the contiguous aggregation of several main chains.

Particulary preferred liquid-crystal polymers are thiophene polymers, which are substituted in position 3 by an alkyl group. Recently, polymer blends and their preparation methods have been developed, said blends utilizing substituted polythiophene polymers which can be processed in molten state [J. E. Österholm, J. Laakso, S. Karjalainen, P. Mononen, FI Patent Application No. 873308]. A problem in these blends is that the processing temperature of the thiophene polymer is high which is related to the rigidity of the thiophene main chain.

The polymers utilized in the invention differ from these conventional blended polymers in that the substituent chain is so long as to make the polymer behave like a liquid-crystal material. For this purpose, the substituent chain must have a minimum of 9 carbon atoms, preferably 10 to 15. For instance, a side chain of 8 carbon atoms does not offer the required liquid-crystal properties, as will be evident from the results of example 3 below.

The examples that will be discussed below utilize a particularly preferred polymer, namely poly(3-dodecylthiophene). Typically, this polymer retains its liquid-crystal properties also at room temperature if rapidly cooled from the temperature of the normal liquid-crystal state to the room temperature. This phenomenon is related to crystallization occurring in the side chains in conjunction with the rapid cooling which prevents crystallization of the main chain.

The matrix polymer of a polymer blend according to the invention can be formed by any suitable polymer material possessing desired tenacity and engineering properties. Particularly preferred are thermoplastic materials. Examples of applicable materials are polyolefins such as polyethene, polypropene, polybutene, polyisobutene, poly(4-methyl-1-pentene), including the copolymers (EPM, EPDM) of ethene and propene as well as chlorinated and chlorine-sulfonated polyethene resins. Also corresponding polyalkanes are possible as matrix polymers provided that they contain styrene, acryl, vinyl and fluoroethyl groups. The examples to be described below utilize polyolefins (polyethene, polypropene), polystyrene as well as a copolymer of ethene and vinylacetate as the matrix polymer.

Additives compatible with the polymer blend such as fillers, pigments and various processing augmenting compounds are possible.

The polymer blends according to the invention can be prepared using conventional techniques such as melt blending of the liquid-crystal polymer with a matrix polymer. Thus, according to one preferred embodiment, LCP is first mixed with matrix polymer as dry pellets. The mixed polymer pellets are then carefully dried before carrying out the melt blending, for instance, in an extruder. Operation temperatures depend on the materials employed. Typically, the temperatures range from 150° to 350° C. The melt blended products are quenched and pelletized again before being formed into the desired products, if desired after admixing compounding ingredients and additives.

Alternatively, the substituted monomers of the conducting liquid-crystal polymer can be intimately contacted with the matrix polymer, after which they are polymerized to achieve a matrix-embedded polymer structure. Thus, the alternatives of monomer polymerization are listed as polymerization in a catalyst-impregnated matrix polymer, electrochemical polymerization in the matrix, or diffusion into the matrix and subsequent polymerization by treatment with an oxidant. Following polymerization, the composite materials are blended with required additives, if any.

The polymer blends prepared by either of the above embodiments are ready for processing and shaping into desired polymer products, such as fibers or films.

The polymer composite is generally doped after processing with a suitable dopant to make the liquid-crystal polymer conducting. The doping of the blended polymer with an electron acceptor dopant can be performed either chemically or electrochemically. Advantageously, the blended polymer is treated with a carrier containing ferric chloride ($FeCl_3$). The carrier can be a suitable organic solvent such as nitromethane, for instance, or any other convenient solvent or suspension-forming agent which does not deleteriously interfere with the doping process by, e.g., dissolving poly(3-alkylthiophene). Typically, such organic solvents are applicable that dissolve the required salt of the dopant and simultaneously cause swelling of the matrix polymer so as to make doping possible.

If desired, the composite polymer can also be doped prior to processing after the melt blending or polymerization steps.

After doping, the polymer blend product such as a film, for instance, is rinsed free from excess dopant using a suitable solvent, preferably of the same kind as used during doping, and the polymer product is dried. An alternative advantageous dopant is iodine, which can be used as such for elevating the conductivity of poly(3-alkylthiophene).

The electrical conductivity characteristics of the polymer can be altered by varying the dopant concentration, doping time and temperature, and the relative concentrations of the blended materials. Typically, the electrical conductivity of the prepared polymer blend can be varied in the range of $10^{-10}$ to 100 S/cm.

The invention makes it possible to prepare composite materials and blends which have superior properties compared to those available in prior-art composite materials. Such composite materials and blends can be used in applications requiring conducting characteristics. The blended polymers can also be processed into products which are suited to applications requiring liquid-crystal properties and to such applications that require both conducting and liquid-crystal properties.

Drawing of a polymer blend containing a liquid-crystal component into, for example, a fiber is easier than that of a material in the isotropic state. Moreover, the effect of electrical and magnetic fields on the alternating, reversible orientation can be utilized. The mechanical properties of fibers drawn in the liquid-crystal state are excellent, since the length-to-diameter ratio of the fiber can be minimized by virtue of the applicability of the maximum drawing parameters.

The invention can be applied to optical devices, films and display terminals in which the reversible or alternating orientation of the liquid-crystal component in the polymer blend under the effect of an electrical or magnetic field can be employed.

In the following the invention is described in greater detail with the help of exemplifying embodiments, which are not to be taken as limiting in any way.

BRIEF DESCRIPTION OF THE DRAWINGS

The appended drawings show the results of thermal analyses performed using a Differential Scanning Calorimeter (DSC), whereby.

DESCRIPTION OF THE PREFERRED EMBODIMENTS

EXAMPLE 1

Preparation of poly(3-dodecylthiophene)

A. Monomer preparation 3-dodecylthiophene was prepared according to EP-203 as follows: Magnesium (dried, 1.6 mol) and dodecyl bromide (dried, 1.5 mol) were mixed in 500 ml dried diethyl ether to obtain a corresponding Grignard reagent. The magnesium and the ether were hereby transferred to a reaction vessel containing an argon atmosphere and the argonated dodecyl bromide was added slowly. An iodine crystal was added to initiate the reaction.

The concentration of the obtained reagent was determined as follows: A 10 ml aliquot of the sample was taken and added to 150 ml of distilled water. The indicator was added and the solution was titrated with 0.2M NaOH at 70° C.

The reagent was transferred to another reaction vessel, to which in an argon atmosphere was slowly added a molar quantity corresponding to the reagent concentration of 3-bromothiophene and dichloro-[1,3-bis(-diphenyl-phosphino)-propane]nickel(II) as a catalyst. To initiate the reaction, the reaction vessel was heated. The solution was refluxed for 4 hours. After this the reaction flask was placed in an ice bath and the mixture was acidified with 1.0N HCl. The mixture was washed in a separatory funnel with water (three times), with saturated $NaHCO_3$ (three times) and dried with $CaCl_2$. The mixture was distilled and the product was 3-dodecylthiophene.

2,5-diiodo-3-dodecylthiophene was prepared as follows: 250 ml of dichloromethane, a 0.4 mol aliquot of the above-prepared 3-dodecylthiophene and 0.5 mol of iodine were transferred to a reaction vessel (argon atmosphere). A 1:1 mixture of 90 ml nitric acid and water was slowly added, and the temperature of the reacted mixture was slowly elevated to 45° C. The solution was refluxed for 4.5 hours. After this the reacted mixture was washed three times with water, three times with 10% NaOH and again two times with water. Filtration and purification of the product were performed in a column (silica+hexane). The product was 2,5-diiodo-3-dodecylthiophene.

B. Polymerization

Poly(3-dodecylthiophene) was prepared as follows: a 0.3 mol aliquot of the above-prepared 2,5-diiodo-3-dodecylthiophene, 0.3 mol of magnesium and 200 ml of tetrahydrofurane (THF) were added in a reaction vessel and refluxed for 2 hours. A 0.001 mol aliquot of a catalyst (dichloro-(1,3-bis(diphenyl-phosphino)-propane)-nickel(II)) was added. The reaction vessel was cooled to 20° C. prior to the addition of the catalyst. The temperature was elevated to 70° C. and the solution was refluxed for 20 hours. The obtained product was poured in methanol (1200 ml methanol+5% HCl). The mixture was allowed to stabilize for 2 hours. After this, the mixture was filtered and washed with hot water and methanol. Extraction was performed with methanol and drying in a vacuum. The product was poly(3-dodecylthiophene).

EXAMPLE 2

Thermal analysis of a blend of poly(3-dodecylthiophene) and EVA

An aliquot of 20 parts of the poly(3-dodecylthiophene) prepared in Example 1 and 80 parts of ethene-vinylacetate copolymer (EVA20) acting as the matrix polymer were melt blended by methods known per se to obtain a polymer blend.

Figure 1A:
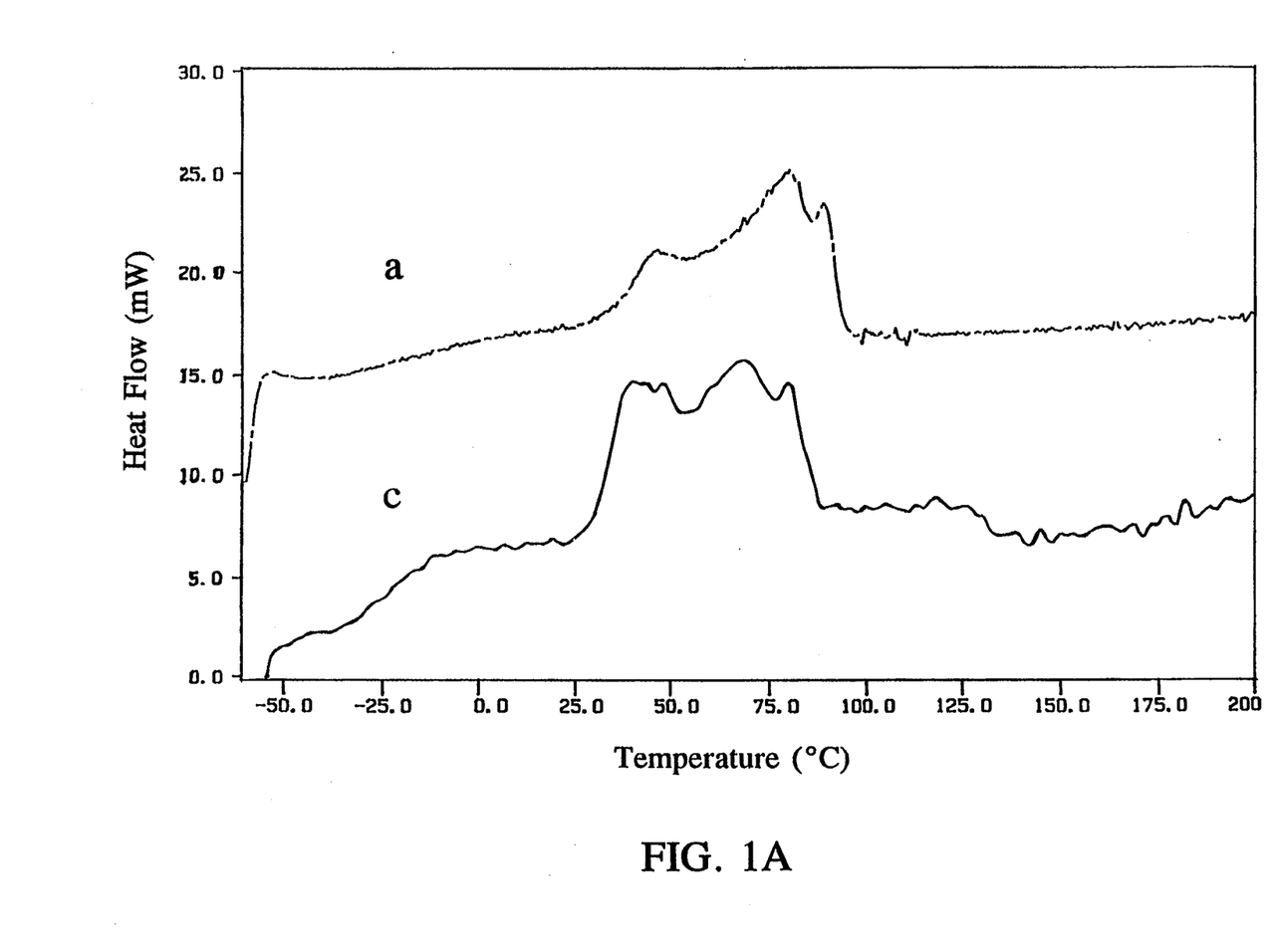
FIG. 1A shows the heating curve (curve a) of an EVA20 copolymer and the heating curve (curve c) of a poly(3-dodecylthiophene)/EVA20 polymer blend.
Figure 1B:
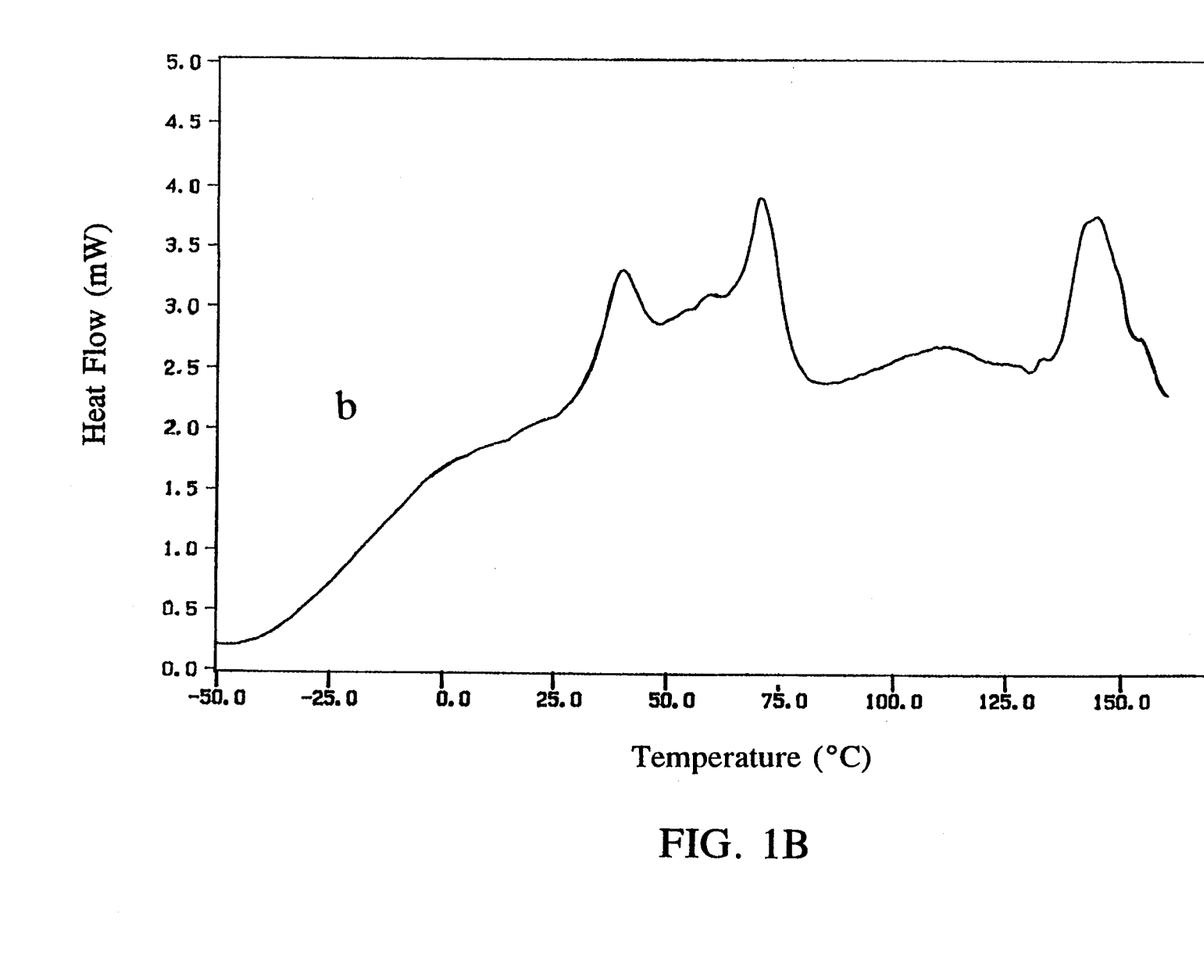
FIG. 1B shows the heating curve of poly(3-dodecylthiophene)

The thermal behavior of the components in the blend were first investigated separately using DSC (Perkin Elmer 7). FIG. 1a shows a thermogram obtained from the EVA copolymer indicative of that melting is completed at approx. 90° C. and the polymer can be processed at temperatures above this. FIG. 1b shows the thermogram of poly(3-dodecylthiophene). As is evident from the graph, it has three endothermic phase transition shifts. The first, $T_1$, occurs at 35° C., which is the melting point of the alkyl side chain. $T_2$, the second transition temperature, represents the phase change from the crystalline state to the liquid-crystal state, which is a comb-like layered structure, in which the interlayer spacing varies according to the length of the side chains. In this liquid-crystal state the material possesses a degree of order resembling that of a solid material, yet exhibiting a fluid creep property that facilitates processing, for instance, within this temperature range.

$T_3$ is the phase transition temperature from the liquid-crystal state to the isotropic state, in which the material behaves like a solution lacking any degree of order.

FIG. 1c shows the thermal analysis results for the 20/80 PDDT/EVA20 blend. The graph indicates that the side chains of polyundecylthiophene melt at 35° C. and the main chain fuses at 60° C. and EVA20 melts at 70° C. All these transitions seem to occur at slightly lower temperatures in comparison with the same transitions measured from the individual components separately. This may be related to the interaction between the components, which also dampens the transition between the liquid-crystal and isotropic states. The latter transition, however, depends on the effect of the thermal energy involved, thereby requiring slow, possibly even isothermic heating within the liquid-crystal region. The goal is not, however, to characterize the blend of the conducting liquid-crystal polymer and the matrix polymer on the basis of thermodynamic criteria.

EXAMPLE 3—REFERENCE EXAMPLE

Polyoctylthiophene

Starting from octyl bromide and 3-bromothiophene, poly(3-octylthiophene) was prepared in the manner described in Example 1. The polymer was subjected to thermal analysis as described in Example 2. The thermogram contained two endothermic phase transitions, of which the first represented the melting of the crystallized octyl group and the second the isotropic melting, respectively. Correspondingly, this polymer does not exhibit liquid-crystal properties in the molten state, which is evidently related to the fact that the alkyl side group is not sufficiently long to accomplish the required dissolving effect.

EXAMPLE 4

Polymer preparation using an extruder

Using an extruder (Brabender), a poly(3-dodecylthiophene) sample was prepared by melt blending. The blending temperature was 170° C., at which temperature the isotropic state ($T>T_3$) was attained. The blending time was 10 min and the rotation speed 30 r/min.

EXAMPLE 5

Polymer preparation using an extruder

Using the Brabender apparatus of example 4, a poly(3-dodecylthiophene) sample was prepared. The blending temperature was 130° C. (liquid-crystal state, $T_2<T<T_3$), the blending time 20 min and the rotation speed 30 r/min.

EXAMPLE 6

Processing of sheets

The polymer samples prepared in Examples 4 and 5 were processed into sheet pieces by injection molding in either the liquid-crystal state or the isotropic state. The injection time was 5 min, the temperature either 130° C. or 170° C. and the pressure 100 bar.

EXAMPLE 7

Processing of films

The polymer samples prepared in Examples 4 and 5 were ground into granulates, which were further processed by blowing into polymer films. The processing was carried out in the Brabender apparatus, whose block temperatures were in the range from 150° C. to 170° C.

EXAMPLE 8

Doping of the polymer

The polymer samples prepared in Examples 4 and 5 were doped. The samples were immersed in concentrated $FeCl_3$-nitromethane solution (dry argon atmosphere). After doping for one hour, the samples were washed with nitromethane and vacuum dried. The electrical conductivity of the polymer samples was measured to be 1 S/cm.

EXAMPLE 9

Doping of the processed polymers

The films processed according to Examples 6 and 7 were doped with iodine vapor in a vacuum. The electrical conductivity of the doped films was measured to be 1 S/cm.

EXAMPLE 10

Liquid-crystal properties of processed polymers at room temperature

The polymer sheets processed according to Examples 6 and 7 were pressed at 130° C. to attain the liquid-crystal state. The samples were cooled in an icewater bath to achieve side-chain crystallization. The side-chain crystallization was hereby capable of preventing the liquid-crystal state from reverting to the crystalline state. Consequently, the sample remained in the liquid-crystal state even at the room temperature. The sample was doped with iodine vapor. The electrical conductivity of the sample was measured to be 1 S/cm.

EXAMPLE 11—REFERENCE EXAMPLE

Polyundecyl isocyanate

Analogously to Example 1, polyundecyl isocyanate was prepared and subjected to analysis using the apparatus described in Example 2. The obtained thermogram indicated that polyundecyl isocyanate—as well as poly(3-undecylthiophene)—has three transitions ($T_1$ to $T_3$), of which $T_2$ is the transition temperature from the crystalline state to the liquid-crystal state and $T_3$ is the transition temperature from the liquid-crystal state to the isotropic state. $T_1$ is melting point of the alkyl side chain. Consequently, polyundecyl isocyanate is a liquid-crystal polymer according to the application. The liquid-crystal state can be either a nematic or smectic layered structure. Doping of said polymer, however, did not invoke any electrical conductivity properties.

EXAMPLE 12

Figure 2:
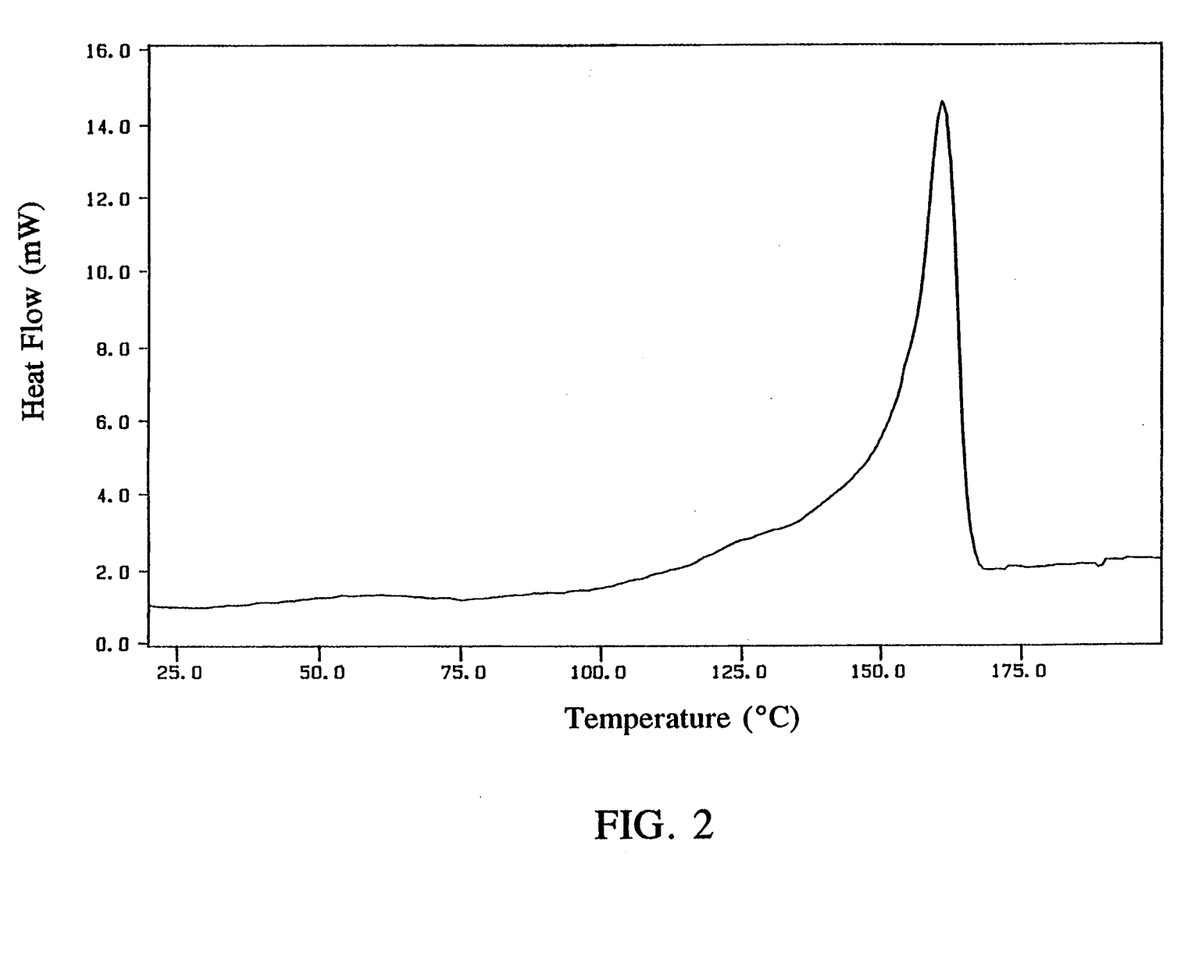
FIG. 2 shows the heating curve of a 50:50 blend of polydodecylthiophene and polypropene.

Thermal analysis of a 50:50 blend of poly(3-dodecylthiophene) and polypropene A conducting liquid-crystal polymer, poly(3-dodecylthiophene) (later called as PDDT) and polypropene matrix polymer were prepared into a 50:50 blend, which was subjected to DSC thermal analysis. The results are shown in FIG. 2 indicating only a single transition temperature corresponding to the melting of polypropene at 167° C. The amount of PDDT in the blend is too small to be detectable in the melting behavior of the polymer.

EXAMPLE 13

Figure 3:
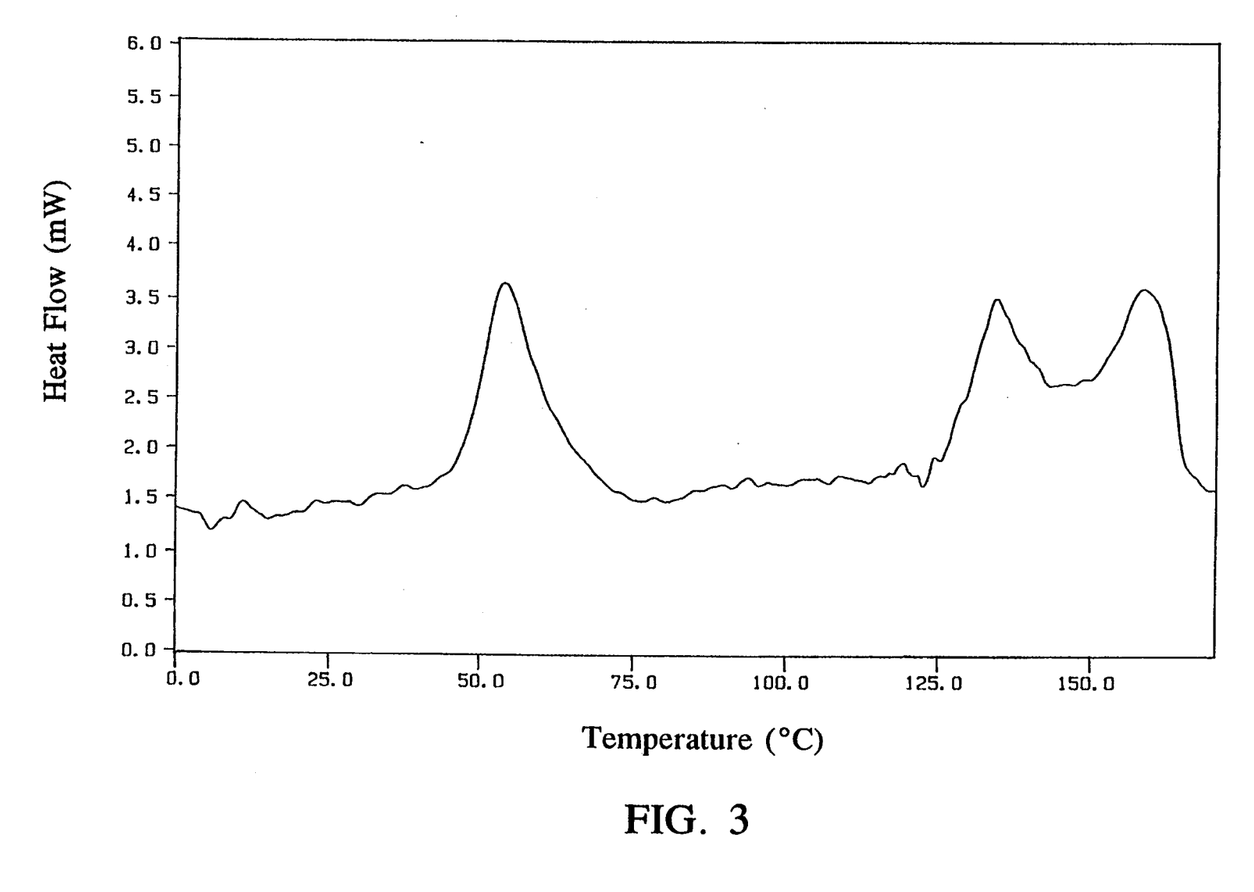
FIG. 3 shows the heating curve of a 90:10 blend of polydodecylthiophene and polypropene.

Thermal analysis of a 90:10 blend of poly(3-dodecylthiophene) and polypropene The same materials as used in Example 12 were prepared into a 90:10 blend, whose thermogram is shown in FIG. 3. Now the thermogram indicates three transition temperatures, the first of which (T=60° C.) corresponds to the transition of PDDT from the crystalline state to the liquid-crystal state. The second peak (T=135° C.) corresponds to the transition of PDDT from the liquid-crystal state to the isotropic state and the third transition temperature corresponds to the melting of polypropene at 167° C.

EXAMPLE 14

Figure 4:
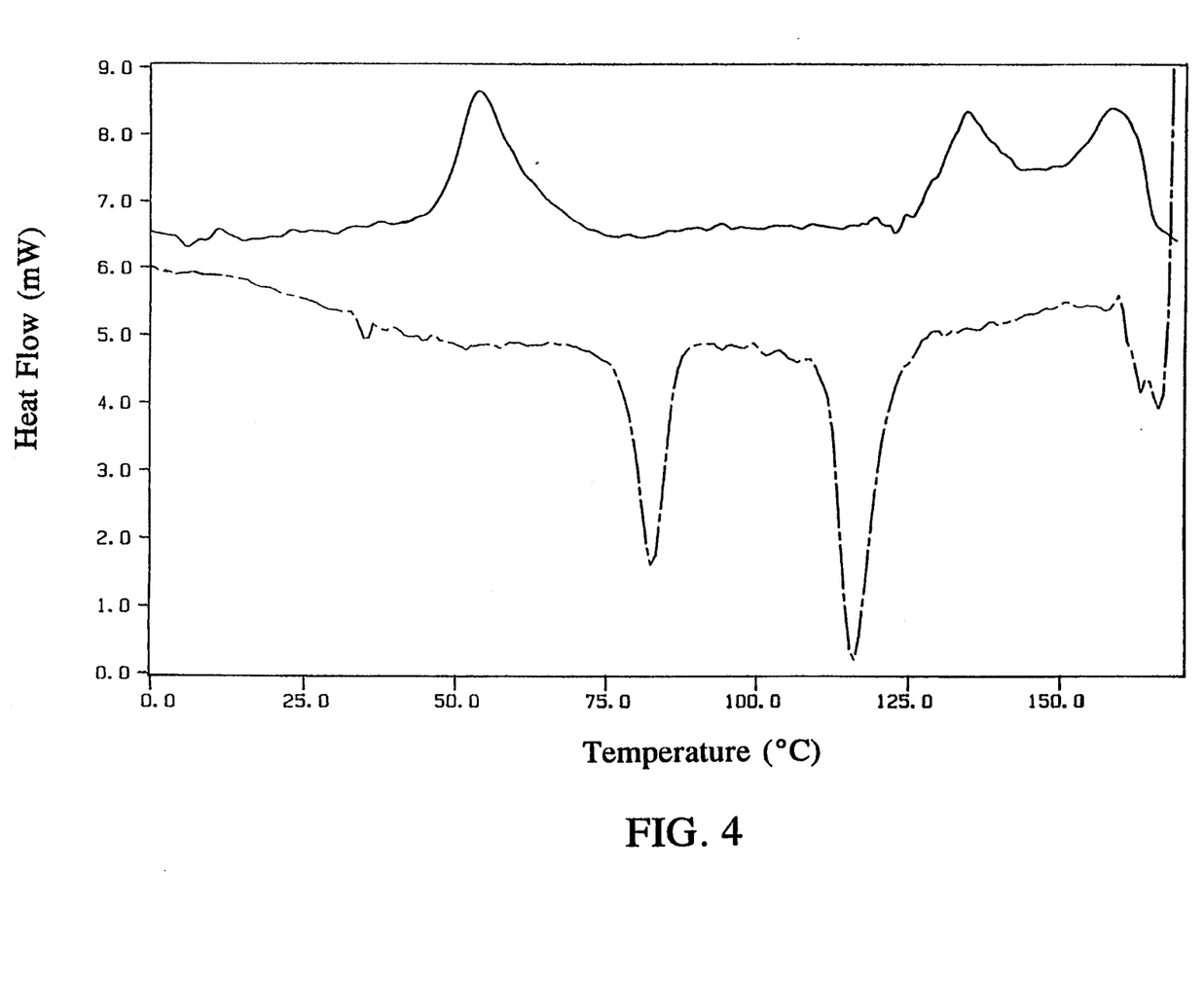
FIG. 4 shows the comparison of the heating curve (upper curve of the diagram) of the above diagram to the cooling curve of the same blend (lower curve)

Thermal analysis of the 90:10 blend of poly(3-dodecylthiophene) and polypropene FIG. 4 shows the heating graph of the polymer blend described in Example 13 which is the same as the heating graph shown in FIG. 3, complemented with a new graph, which is the cooling thermogram of the blend. As is evident from the graph, two transition temperatures can be detected therein, the first of which (T=120° C.) is related to the crystallization of polypropene and the second (T=80° C.) to the formation of the liquid-crystal phase in PDDT.

Examples 12 to 14 indicate that PDDT and PP exist in a single polymer blend. The electrical conductivity of the 90:10 blend after doping with ferric(III)chloride is $10^{-5}$ S/cm.

EXAMPLE 15

A 50:50 blend of poly(3-dodecylthiophene) and polystyrene

Figure 5:
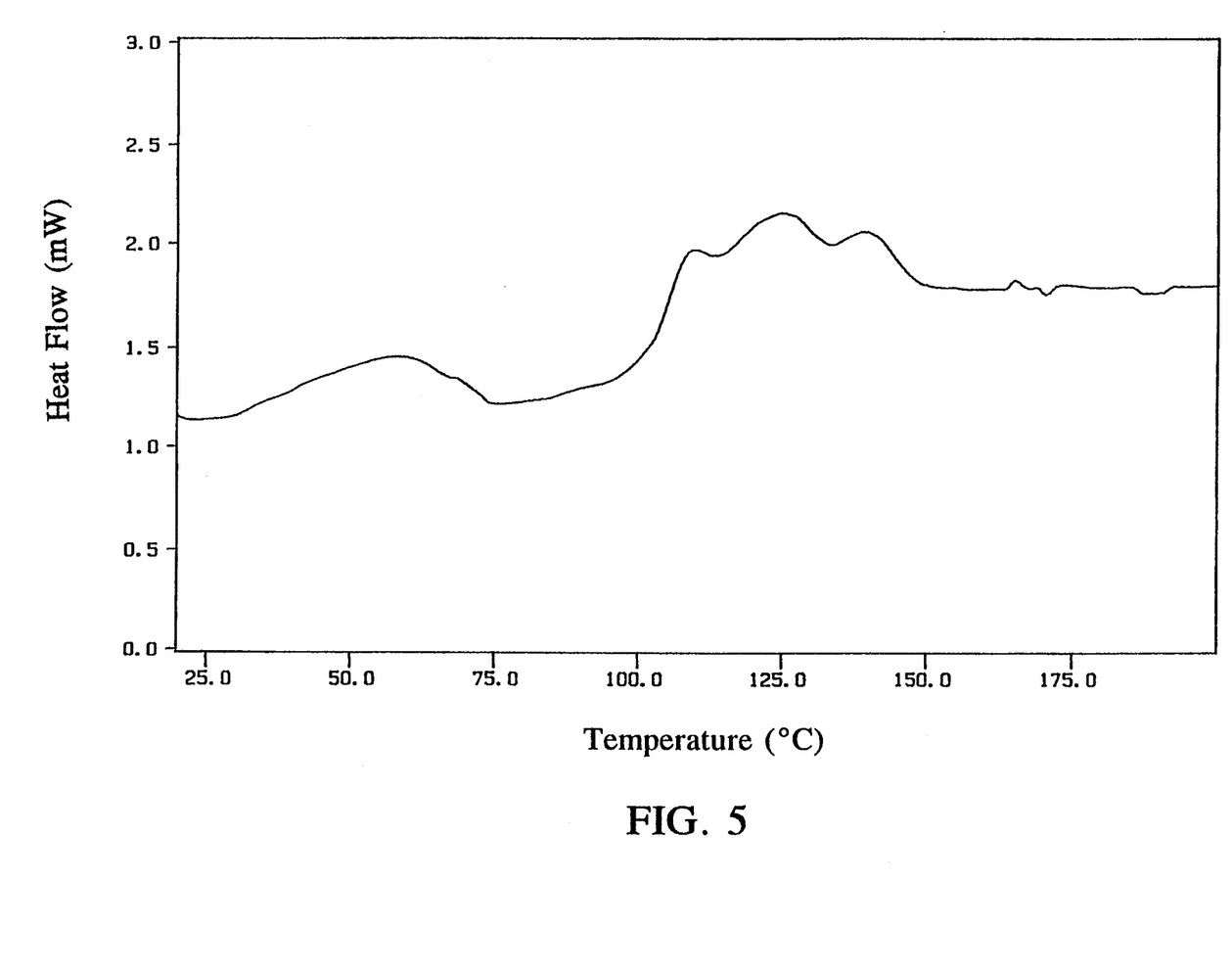
FIG. 5 shows the heating curve of a 90:10 blend of polydodecylthiophene and polystyrene.

The thermal behavior of the blend given in the title above was investigated using DSC calorimetry. The results are shown in FIG. 5. The blend has a wide endotherm over the temperature range of 50° to 70° C., which corresponds to the transition of PDDT from the crystalline state to the liquid-crystal state. The transition of PDDT from the liquid-crystal phase to the isotropic phase takes place at 135° to 140° C. The glass transition of polystyrene takes place at 105° C. The thermogram of FIG. 5 indicates that PDDT and PS exist in a single blend and that the liquid-crystal properties of PDDT are retained also in the blend. The electrical conductivity of the blend was $10^{-5}$ S/cm.

EXAMPLE 16

Blend of poly(3-dodecylthiophene) and UHMWPE

Figure 6:
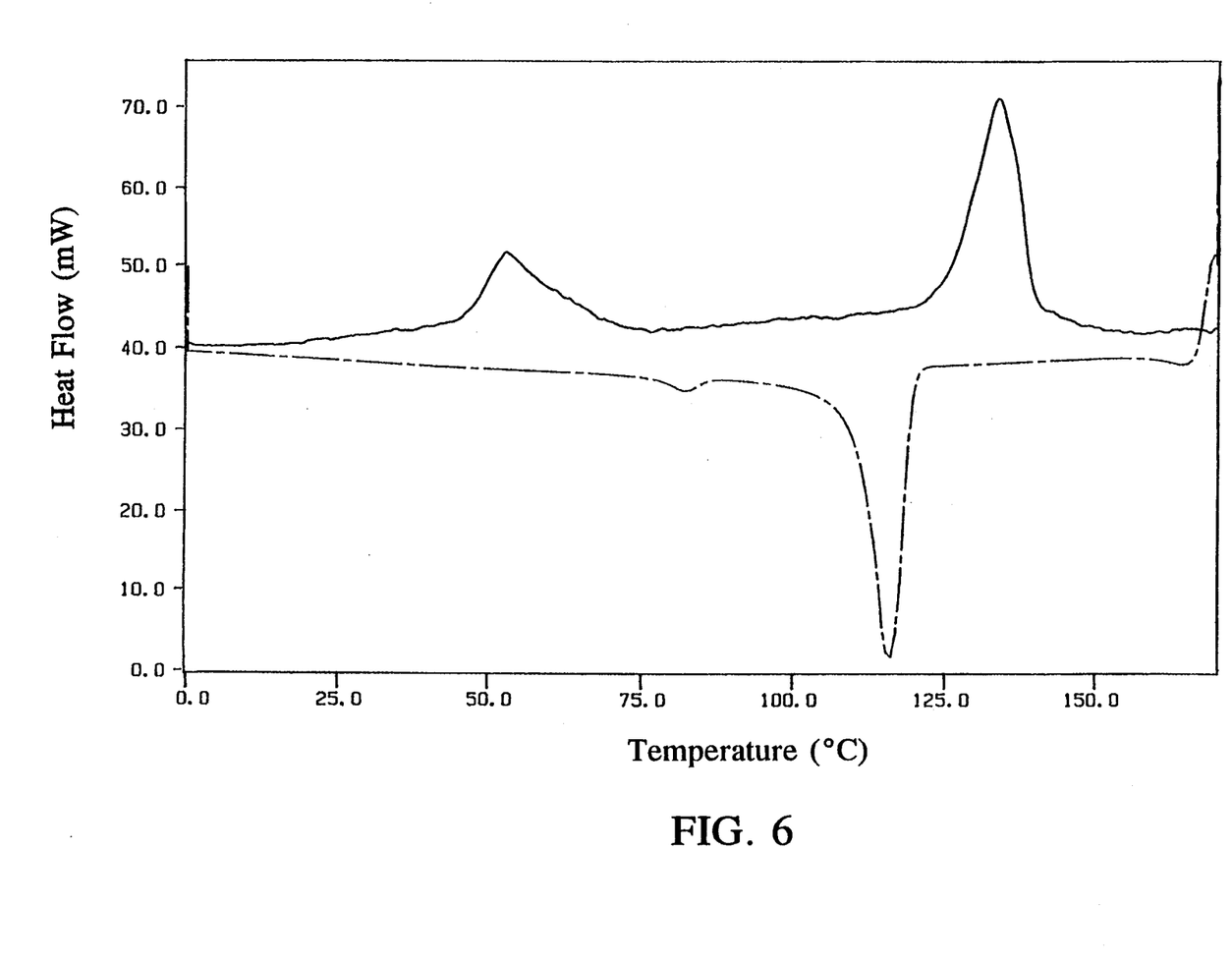
FIG. 6 shows the heating curves and cooling curves, respectively, of a blend of polydodecylthiophene and UHMWPE polymer.

Polyethene of extremely high molecular weight (Ultra High Molecular Weight Poly Ethene, UHMWPE) and PDDT were blended and the blend was investigated using a DSC calorimeter first by heating the blend and then by cooling it back to room temperature. FIG. 6 indicates how PDDT undergoes a transition from the crystalline state to the liquid-crystal state at approx. 50° to 60° C. The melting of PE takes place at approx. 135° C. that simultaneously conceals the phase transition of PDDT from the liquid-crystal state to the isotropic state. The cooling thermogram indicates crystallization of PE at 116° C. and the formation of the liquid-crystal phase of PE at approx. 80° C.

We claim:

1. A conducting polymer blend essentially comprising:
   a matrix polymer; and
   an electrically conducting thermotropic liquid-crystal polymer comprising a rigid main chain containing monomer units having conjugated double bonds, the monomer units of said main chain being linked to side chains which are comprised of alkyl substituents containing at least 9 carbon atoms, said side chains together with the main chain providing the polymer liquid-crystal properties, said conducting polymer having been melt blended with the matrix polymer by being processed at a temperature above the transition temperature which represents a phase change from the crystalline state to the liquid-crystal state of said conducting polymer and having been treated with dopant to render it conducting.

2. The polymer blend of claim 1, wherein the side chains of the conducting polymer are comprised of alkyl substituents containing 10 to 15 carbon atoms.

3. The polymer blend of claim 1, wherein the main chain of the conducting polymer is selected from the group of polythiophene, polyaniline, polyacetylene, polypyrrole and polyparaphenylene.

4. The polymer blend of claim 1, wherein the conducting polymer is selected from the group of poly(3-undecylthiophene) and poly(3-dodecylthiophene).

5. The polymer blend of claim 1, wherein the conducting polymer contains a dopant selected from the group of ferric chloride and iodine.

6. The polymer blend of claim 1, wherein the matrix polymer is selected from the group of polyethene, polypropene, polybutene, poly-isobutene, poly(4-methyl-1-pentene), ethene and propene copolymers, chlorinated and chlorosulfonated polyethenes, polyalkanes containing styrene, acryl, vinyl or fluoroethyl groups and blends thereof.

7. The polymer blend of claim 1, having an electrical conductivity in the range from $10^{-10}$ to 100 S/cm.

8. The polymer blend of claim 1, wherein the conducting component is in the liquid-crystal phase at room temperature.

9. Polymer fibers essentially consisting of a conducting polymer blend as recited in claim 1.

10. Polymer films essentially consisting of a conducting polymer blend as recited in claim 1.

11. The polymer blend of claim 1, additionally comprising one of a filler and a pigment.

12. The polymer blend of claim 1, wherein the conducting polymer has been melt blended in the liquid-crystal state.

13. The polymer blend of claim 1, wherein the conducting polymer has been melt blended in the isotropic state.

* * * * *